(12) United States Patent  (10) Patent No.: US 8,346,738 B2
Nigul  (45) Date of Patent: Jan. 1, 2013

(54) VERIFICATION OF DATA CATEGORIZATION

(75) Inventor: Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 12/346,230

(22) Filed: Dec. 30, 2008

(65) Prior Publication Data

US 2010/0169319 A1 Jul. 1, 2010

(51) Int. Cl.
*G06F 17/30* (2006.01)
(52) U.S. Cl. ....................................... 707/693
(58) Field of Classification Search .................... 707/693
See application file for complete search history.

(56) References Cited

U.S. PATENT DOCUMENTS

| | | | | |
|---|---|---|---|---|
| 5,689,698 | A * | 11/1997 | Jones et al. | 1/1 |
| 6,640,228 | B1 * | 10/2003 | Handerson et al. | 1/1 |
| 6,792,422 | B1 * | 9/2004 | Stride et al. | 707/693 |
| 7,185,024 | B2 * | 2/2007 | Zhou et al. | 1/1 |
| 7,349,917 | B2 | 3/2008 | Forman et al. | |
| 7,603,348 | B2 * | 10/2009 | He et al. | 1/1 |
| 2004/0088320 | A1 * | 5/2004 | Perry | 707/103 R |
| 2004/0117395 | A1 | 6/2004 | Gong et al. | |
| 2005/0021545 | A1 * | 1/2005 | Lulich et al. | 707/100 |
| 2005/0203900 | A1 * | 9/2005 | Nakamura et al. | 707/5 |
| 2006/0004700 | A1 * | 1/2006 | Hofmann et al. | 707/2 |
| 2006/0041604 | A1 * | 2/2006 | Peh | 707/205 |
| 2006/0074986 | A1 * | 4/2006 | Mallalieu et al. | 707/104.1 |
| 2006/0085370 | A1 * | 4/2006 | Groat et al. | 707/1 |
| 2006/0122979 | A1 * | 6/2006 | Kapur et al. | 707/3 |
| 2007/0156722 | A1 * | 7/2007 | Simonyi | 707/100 |
| 2008/0120268 | A1 * | 5/2008 | Ruiz et al. | 707/1 |
| 2008/0147663 | A1 * | 6/2008 | Vernau et al. | 707/7 |
| 2009/0210389 | A1 * | 8/2009 | Firestein et al. | 707/3 |

FOREIGN PATENT DOCUMENTS

| | | |
|---|---|---|
| KR | 1020050034475 A | 4/2005 |
| KR | 1020080014358 A | 2/2008 |

OTHER PUBLICATIONS

Januszewski, "The Importance of Metadata: Reification, Categorization, and UDDI", Microsoft Corporation, 2008, pp. 1-13, retrieved Sep. 22, 2008 http://msdn.microsoft.com/en-us/library/ms953942(printer).aspx.

* cited by examiner

*Primary Examiner* — Robert Beausoliel, Jr.
*Assistant Examiner* — Noosha Arjomandi
(74) *Attorney, Agent, or Firm* — Yee & Associates, P.C.; Steven L. Bennett (57) ABSTRACT

Verification and categorization of data in a system that interfaces with common knowledge repositories having different application programming interfaces. The system inputs a data tree structure with categories of information. The relationships in the data tree are queried against common knowledge repositories. A report of potentially erroneous categorizations in the data tree may be output for further review.

11 Claims, 5 Drawing Sheets

VERIFICATION OF DATA CATEGORIZATION

BACKGROUND

1. Field of the Invention

The present disclosure relates generally to information classification and verification and more specifically to the verification of a categorization of data.

2. Description of the Related Art

Data may be stored or categorized by an information technology system. For example, in some customer management systems, data may include customer addresses and streets. Merchandising data may include categories of fruit such as apples and oranges, or a category of grocery may include fruits and vegetables. The accuracy of the data categorization impacts the reliability of the information that may be retrieved by a particular system. However, data that is categorized in a specific format is often input manually into a data structure depending on the application and may therefore be subject to error. Existing methods to check whether data is correctly categorized require specialized methods to check the categorization of data. Often, these methods are specific to information systems that store the categorized data. For example, specific code may need to be written to verify that data in a particular database or information system is categorized properly.

BRIEF SUMMARY

This disclosure describes an innovative technique that verifies data that may be categorized in a data storage system using general information previously stored in common knowledge repositories.

According to a class of innovative embodiments, there is disclosed a computer-implemented method verifying a data categorization in a categorization system. The method includes executable instructions that perform actions comprising determining, within a framework that supports queries, an accuracy of relationships between data that is categorized in a data structure based on information received from a common knowledge repository; responsive to a determination of an incorrect categorization, flagging a relationship within the data structure as potentially inaccurate; and reporting the potentially inaccurate categorization.

According to a class of innovative embodiments, there is disclosed a system that verifies data categorization. The system comprises a verification engine that determines the accuracy of categorization of input data in a data structure; an interface communicatively connected to the verification engine; a repository configured to communicate with the interface; and a plug-in framework that provides support to connect the interface and the repository.

According to a class of innovative embodiments, there is disclosed a computer program product comprising computer recordable media comprising program code. The program code, when executed by a processor, performs actions comprising determining, within a framework that supports queries, an accuracy of relationships between data that is categorized in a data structure; responsive to a determination of an incorrect categorization, flagging a relationship within the data structure as potentially inaccurate; and reporting the potentially inaccurate categorization.

The embodiments of the disclosed processes provide the advantage of easily determining whether data in large data structures is correctly classified.

The embodiments of the disclosed processes also provide the advantage of improving the verification of data classifications by using existing common sense knowledge databases or repositories.

These and other advantages will be more clearly understood from the following detailed description taken in conjunction with the accompanying drawing and claims.

DETAILED DESCRIPTION

The present disclosure is described below with reference to flowchart illustrations and may include one or more block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product comprising a computer usable medium embodying any tangible medium of expression having computer usable program code embodied in the medium. The present disclosure should in no way be limited to the illustrative implementations, drawings and techniques described herein, but may be modified within the scope of the appended claims along with their full scope of equivalents.

Figure 1:
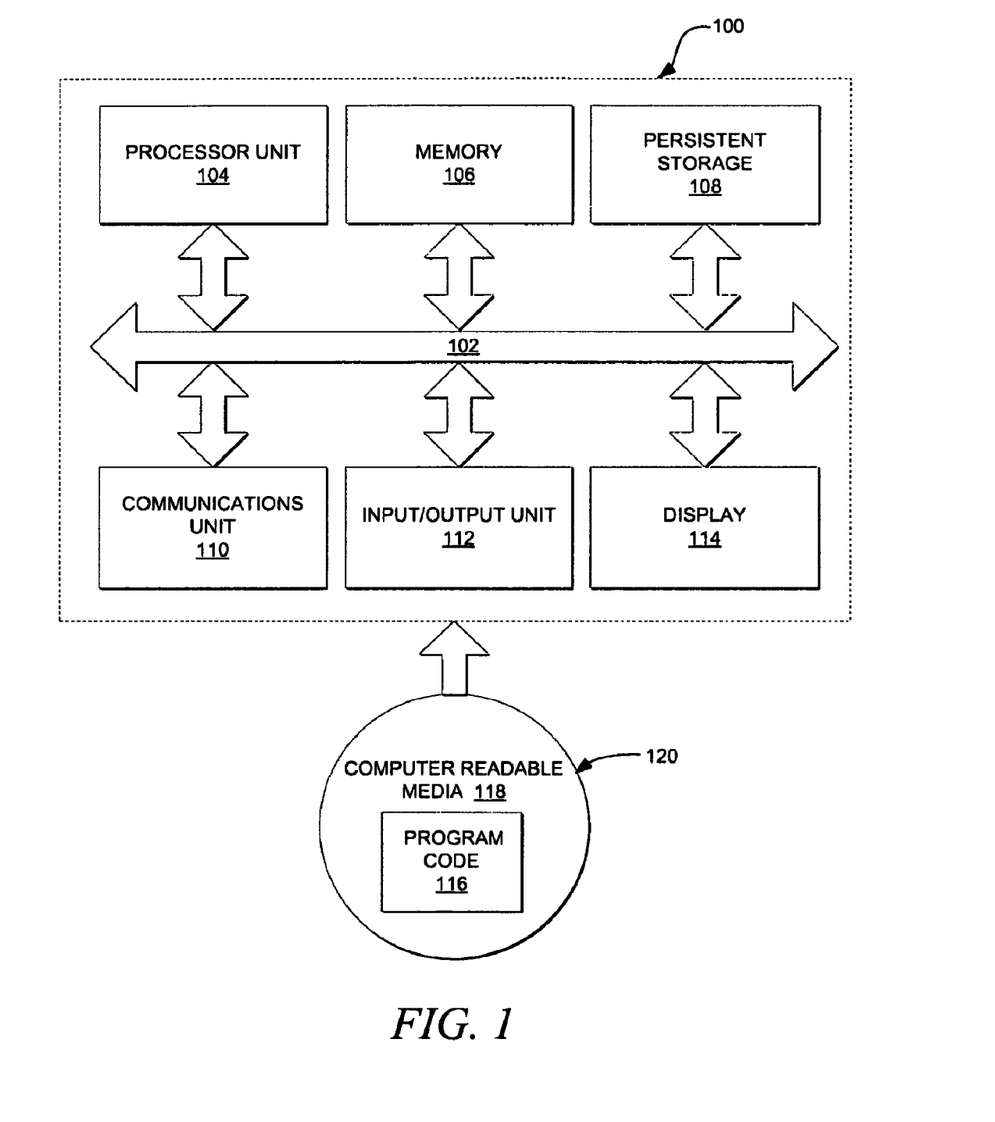
FIG. 1 is a block diagram of an exemplary software environment that may be operable for various embodiments of the disclosure.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108. Embodiments of the disclosure may be implemented by software including, but not limited to Java™, C++, Pascal, or any other functional programming language that is used for automatic memory management as would be obvious to one skilled in the art.

Program code 116 is located in a functional form on computer readable media 118 that is selectively removable and may be loaded onto or transferred to data processing system 100 for execution by processor unit 104. Program code 116 and computer readable media 118 comprise a computer program product 120 in these examples. In one embodiment, computer readable media 118 may exist in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, or transmission-type media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In embodiments of this disclosure, an application programming interface may extract information or knowledge stored in an existing repository to verify whether data that is categorized in a certain format is correct. The application programming interface is generalized to function with any repository that allows queries regarding the types of objects and the relationships between objects in a category.

Figure 2:
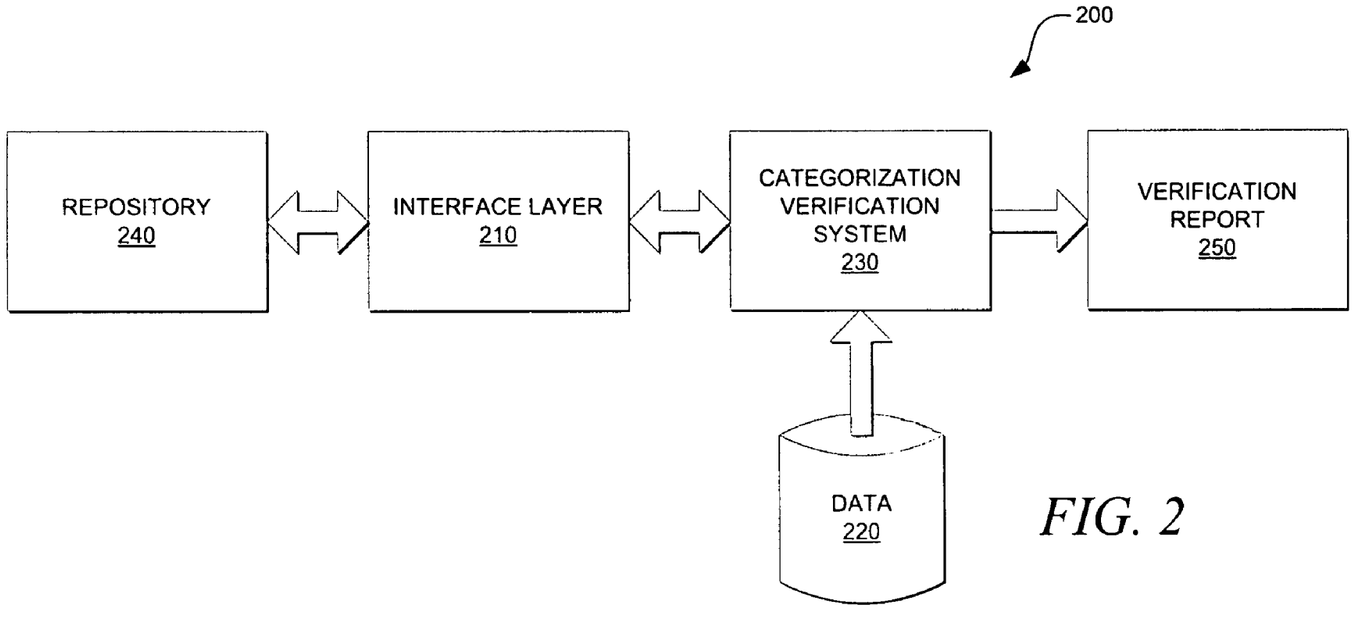
FIG. 2 is a top level implementation model according to one embodiment of the disclosure.

In FIG. 2, an exemplary system 200 represents a possible embodiment of the disclosure. System 200 features an application programming interface layer 210 that translates information. Interface layer 210 may be a well-defined application programming interface layer that may be used to determine isA relationships or other types of categorization relationships that may exist in data. Data 220 may comprise a set of data that maybe input to a categorization verification system 230 for verification of relationships between the data 220 elements. The categorization verification system 230 may invoke the interface layer 210 to determine the relationships that exist in the data 220. The categorization verification system 230 may require that the interface layer 210 be a common or generic interface that allows the processing of queries of a specific nature. The interface layer 210 may also be configurable to operate with a plurality of databases or repositories, such as a repository 240, that may include common knowledge information. Repository 240 may represent a single repository or a plurality of different or similar repositories. In general, repository 240 may provide semantic relationships between words, objects, or anything that may be queried through a well-defined application programming interface to determine a relationship.

Repository 240 includes data that includes information or knowledge considered to be commonsense or commonly known. For example, the data may be commonsense for a broad category of consumers or to practitioners in a specific knowledge domain. The repository may include data input from a plurality of sources in a specific format. It may be assumed that the data in the repository is trusted or accurate data. It is important to note that a commonsense or common knowledge repository may not necessarily be created specifically with the purpose of validating a data set, such as data 220, but may be in some broader context. System 200 may use the application programming interface unique to the repository 240 to do the data validation on a specific set of data 200. It must be noted that any given repository 240 may exist before a set of data 200 may even be created or considered for use.

Repository 240 includes commonsense concepts and the relationships between the concepts. For example, a relationship exists between tennis, a tennis ball, a racket, and running shoes. This relationship may be queried through the application programming interface of the repository that allows questions to be asked and information to be extracted. The query may be, for example, "If tennis is played, what items are required?" The repository may then validly respond with one or more related items in the repository including "tennis ball", "racket", "running shoes". Exemplary commonsense knowledge databases or repositories may include, but are in no way limited to, repositories such as ConceptNet, LifeNet, WordNet, and other such knowledge databases that include relationship information about miscellaneous facts and general information.

Queries may be communicated to the repository 240 through the interface layer 210 regarding the integrity or correctness of the data 220 classification input into the categorization verification system 230. The queries may be a type of structured query language inquiry and perform a semantic analysis on the terms, objects or words submitted to the categorization verification system 230. For example, the query "isA" requires a response that defines a type of relationship. Similarly, the query "isTypeOf" requires the defining of a type of relationship. Each repository 240 may require a unique or specific format for an input query. The responses to the queries may be output to a verification report 250. Verification report 250 may flag or highlight certain relationships within data 220 that may be potentially erroneous and require additional external examination or scrutiny.

Figure 3:
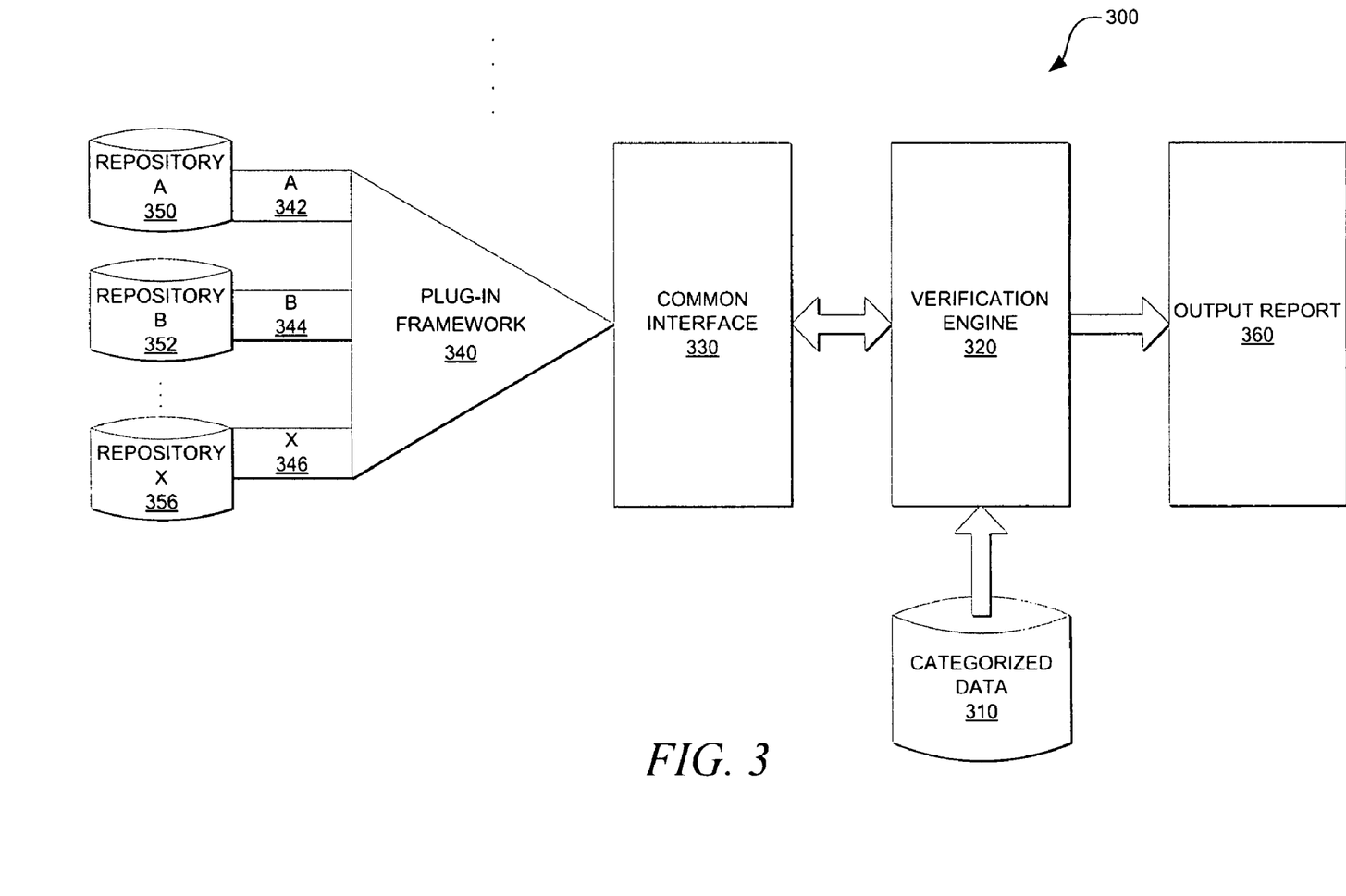
FIG. 3 is a detailed implementation model of the top level structure illustrated in FIG. 2.

FIG. 3, model 300, provides further details of the implementation illustrated in FIG. 2. Categorized data 310 is input to verification engine 320 that may be part of a system or tool that verifies data categorization. The format of the categorized data may be represented as a hierarchical tree data structure that includes parent nodes and linked to various child nodes.

Figure 4:
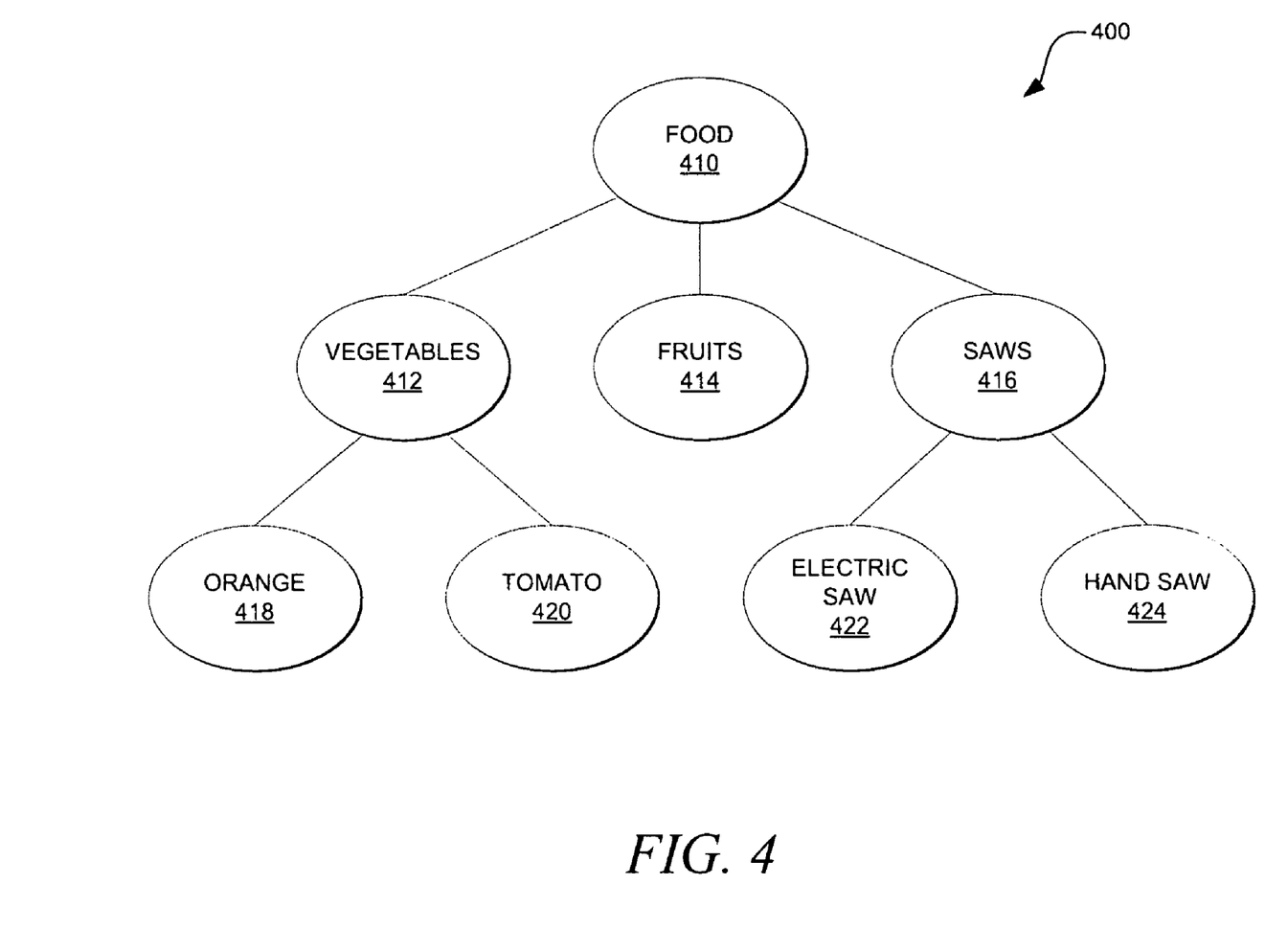
FIG. 4 represents a data structure that may be used for various embodiments of the disclosure.

In one embodiment, the categorized data may be similar to the data tree structure 400 shown in FIG. 4. In FIG. 4, top level or parent node 410 provides the overall categorization of the data as "Food." The parent node 410 may possibly be related to several first level links or child nodes, such as vegetables 412, fruits 414, and saws 416, respectively. There may be further links in the hierarchy that illustrate additional child nodes or links. For example, vegetables 412 may be linked to orange 418 and tomato 420. Saws 416 may be linked to electric saw 422 and hand saw 424. It must be noted that the data tree structure 400 is not limited to the number of nodes or links shown. The number of links and parent and child nodes in any tree structure is a function of the data.

Returning to model 300 of FIG. 3, verification engine 320 may check the accuracy of the categorized data 310 by submitting queries to repositories through a common interface 330. The common interface 330 may be an application programming interface layer that is operationally supported by a plug-in framework 340 that may support various repositories that have different application programming interfaces. For example, repository A 350 may be a common knowledge repository with an application programming interface (API) that is different from the APIs of repository B 352 and repository C 356.

Common interface 330 may include adapters or plug-ins that may be configured to allow the interface to communicate successfully with multiple repositories through the plug-in framework 340. The adapters or plug-ins will be required to be compatible with the corresponding repositories to allow questions to be asked with respect to data structures that have a tree format or involve similar parent and child nodes and links.

The adapter or plug-in may function to normalize the API used by a specific repository to the API expected by the plug-in framework 340 and the common interface 330. For example, repository A may interface to the plug-in network through adapter or plug-in 342. Similarly, plug-in 344 may interface repository B to the plug-in framework 340 and plug-in 346 may interface repository X to the plug-in framework 340. It must be noted that the number of repositories shown in FIG. 300 is in no way limited to three or any specific number. The number of repositories may be dependent on implementation or other criteria.

The common interface 330 may present queries from the verification engine 320 regarding objects and relationships between objects and categories of objects in data 310. For example, the query may be similar to an "isA" query. Other queries that may discern the relationship between types and subtypes of data exist and would be obvious to one skilled in the art. The repository may be able to provide a valid response through plug-in framework 340 to the common interface 330.

For example, an isA query using to repository A 350 from the verification engine 320 may be "is apple A mammal?" The repository may respond with a valid affirmative, negative, or indeterminate response. A valid affirmative response may be "yes". A valid negative response may be "no" and a valid indeterminate response may be "I don't know". In another example, a query to repository B 352 from verification engine 320 may be "is book An object?" Repository B 352 may respond affirmatively that book is an object.

The responses to the queries of the verification engine 320 provide information regarding the accuracy of the categorized data 310. The verification engine 320 collects the response to the queries and outputs them to a report 360. The report 360 may be a text file or other type of report that highlights the relationships in the data tree structure of the categorized data 310. The report 360 may provide information on potentially erroneous or incorrect categorization that may exist in the data structure. An external or manual examination of the report 360 may be performed to verify the information.

Figure 5:
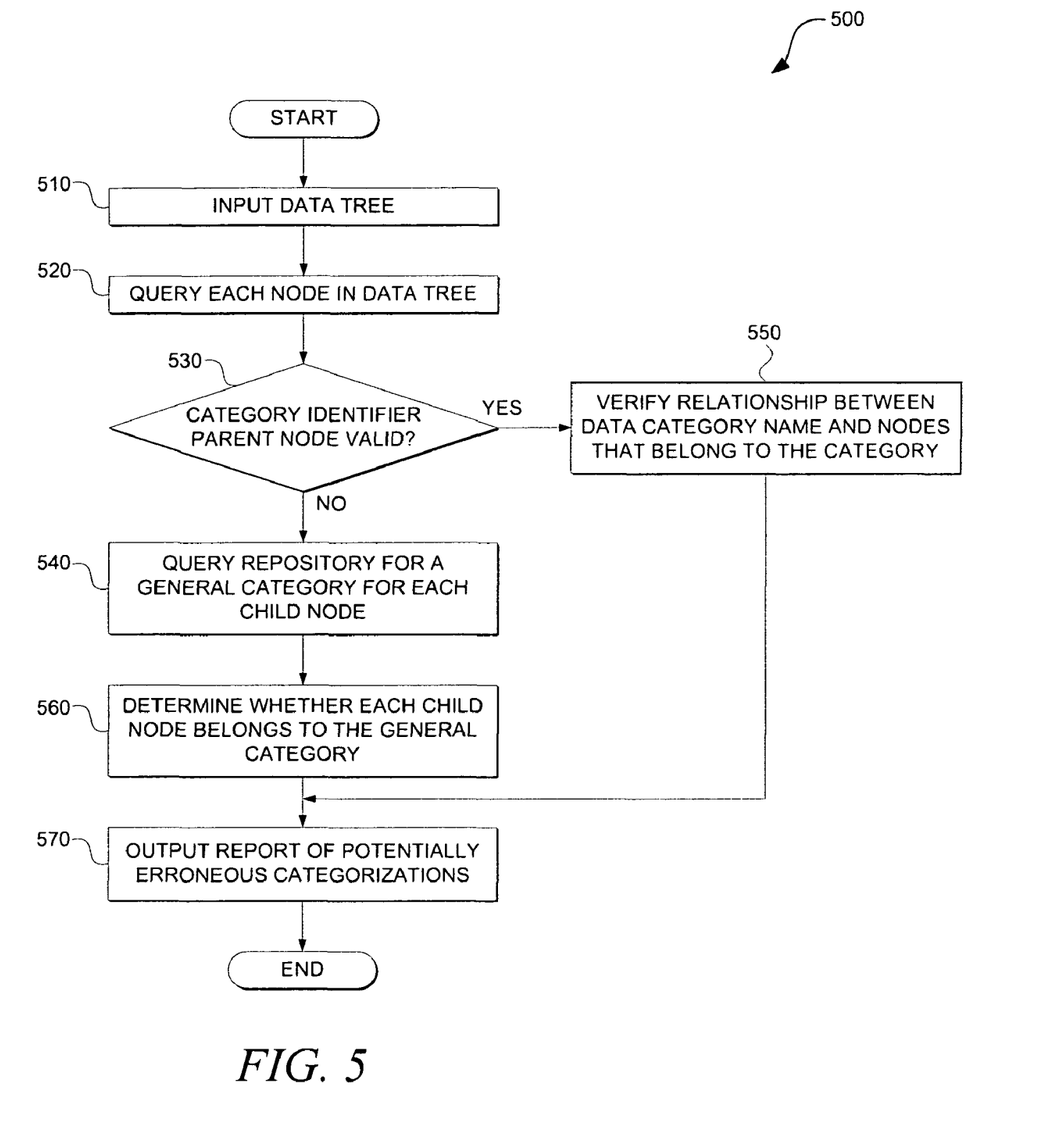
FIG. 5 is a flowchart detailing the verification process according to an embodiment of the current disclosure.

FIG. 5, flowchart 500, provides a summary of the method according to an embodiment of the disclosure. At a block 510, data in a format of a tree structure may be input to a framework or verification engine. The data tree is parsed on a node-by node-basis, to determine the relationships of the tree. At a block 520, the verification engine may perform a query to a repository regarding the category of the node and its relationship in the structure as the data tree is being parsed. Initially, at a block 530, the category name of the parent node is checked to determine whether the category has a valid or meaningful identifier or name. The verification engine may query the repository to determine whether the parent node has a meaningful identifier. If it is determined that the node identifier has a meaningful name, at a block 550, the verification engine may proceed to verify the relationships or links that exist between the data category name and the nodes that belong to the category. A determination that the parent node identifier does not have a meaningful name may cause the verification engine to invoke additional queries that try to identify a common category of the child nodes.

At a block 540, the verification engine would query the repository for general categories that may identify each child node. At a block 560, the verification engine may determine whether each child node belongs to the certain general category. At a block 570, a report of potential erroneous categorizations may be output for further manual examination and review.

Returning to FIG. 4, data tree structure 400 may be processed using the method described in FIG. 5, flowchart 500. In data tree structure 400, the method may parse the data tree and examine each link between the nodes to determine whether the links are correct, incorrect, or indeterminate. The method may begin with at node 410 and checks whether the first level node 410 is a meaningful name. For example, it could be that the name of the first level node is identified or names as "N2020" or something that is meaningless. But in this case, node 410 is validly named "Food." The first node linked to food is Vegetable 412. This information is input to a repository being used through an API and a query is presented. The query may be "is vegetable A food?" The repository, based on the knowledge stored in the repository, may output an affirmative response to the query such as a "yes". The affirmative response may therefore verify the categorization link between the parent node of food 410 and the child node of vegetable 412.

The parsing of the data tree structure 400 may then continue to the next link of orange 418. The query may be "is orange A vegetable?" The repository, based on the common knowledge stored in the repository, may respond to the query with a negative response, such as "no" response. The categorization link between the parent node of vegetable 412 and the child node of orange 418 may then be marked by the verification engine as being potentially erroneous. The verification engine collects the query responses and reports them for later examination.

The method continues parsing through the other links in data tree structure 400. For example, the verification engine may query the link between the parent node food 410 and child node saws 416 to a repository. The query may be formatted as "is saw A food?" The repository, based on the common knowledge stored in the repository, may respond to the query with a negative response, such as "no" response. The categorization link between the parent node of food 410 and the child node of saws 416 may be marked by the verification engine as being potentially erroneous. The responses to the queries to the repositories may be collected for further manual review by an external source.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product comprising a computer-usable or computer-readable medium tangibly embodying program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, semiconductor system, apparatus or device. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of verifying a data categorization in a categorization verification system, the method including executable instructions that perform actions comprising:
    determining, within a framework that supports queries, an accuracy of semantic relationships between data that is categorized in a data structure based on information received from a common knowledge repository comprising a set of common semantic relationships, the determining further comprising:
        parsing nodes of the categorized data in the data structure, wherein the data structure is a data tree structure comprising a set of nodes and a set of semantic relationships of the set of nodes; and sending a query to the common knowledge repository through the framework regarding the semantic relationships between each node in the data structure wherein the query performs an analysis of the semantic relationships between the set of nodes in the data structure and flags erroneous semantic relationships between the set of nodes;
        determining whether a category identifier of a node in the data structure is valid, wherein responsive to the category identifier of a parent node being valid, verifying a relationship between the parent and a child nodes of the data structure, and wherein responsive to the category identifier of a parent node not being valid, sending a query to the common knowledge repository to determine a general category for each child node;
        responsive to a determination of an incorrect categorization, flagging a semantic relationship within the data structure as potentially inaccurate; and reporting the potentially inaccurate categorization.

2. The computer-implemented method of claim 1, wherein the determining comprises sending a query to a common knowledge repository to verify a relationship between nodes in the data structure.

3. The computer-implemented method of claim 1, further comprising determining whether each child node belongs to the general category based on a response to the query to the common knowledge repository.

4. A system that verifies data categorization, the system comprising:
    a processor;
    a verification engine, in the processor, that determines an accuracy of a categorization of input data in a data structure, wherein the data structure is a tree structure that is hierarchical, includes parent nodes and child nodes, and also includes a set of semantic relationships of the parent nodes and the child nodes;
    the verification engine also determines whether a category identifier of a node in the data structure is valid, wherein responsive to the category identifier of a parent node being valid, verifying a relationship between the parent and a child nodes of the data structure, and wherein responsive to the category identifier of a parent node not being valid, sending a query to the common knowledge repository to determine a general category for each child node;
    an interface communicatively connected to the verification engine;
    a common knowledge repository configured to accept a communication from the interface; and
    a plug-in framework that connectively supports the interface and the repository; wherein the verification engine parses nodes of data in the data structure; and sends a query to the common knowledge repository through the framework regarding the semantic relationship between each node in the data structure.

5. The system of claim 4, wherein the verification engine, responsive to the determination, flags a potentially inaccurate categorization within the data structure.

6. The system of claim 4, wherein the repository comprises information in a commonsense knowledge database.

7. The system of claim 4, wherein the repository is a common knowledge repository that comprises an application programming interface, the application programming interface being configured to support queries.

8. The system of claim 7, wherein a response to a query to the repository provides an information regarding a relationship between objects stored in the repository.

9. The system of claim 7, wherein the plug-in framework normalizes the application programming interface used by the repository.

10. A computer program product comprising a non-transitory computer recordable media comprising program code, which when executed by a processor, perform actions comprising:

determining, within a framework that supports queries to a common knowledge repository, an accuracy of semantic relationships between data that is categorized in a data structure based on information received from a common knowledge repository comprising a set of common semantic relationships, the determining further comprising:

parsing nodes of the categorized data in the data structure, wherein the data structure is a data tree structure comprising a set of nodes and a set of semantic relationships of the set of nodes; and sending a query to the common knowledge repository through the framework regarding the semantic relationships between each node in the data structure wherein the query performs an analysis of the semantic relationships between the set of nodes in the data structure and flags erroneous semantic relationships between the set of nodes;

determining whether a category identifier of a node in the data structure is valid, wherein responsive to the category identifier of a parent node being valid, verifying a relationship between the parent and a child nodes of the data structure, and wherein responsive to the category identifier of a parent node not being valid, sending a query to the common knowledge repository to determine a general category for each child node;

responsive to a determination of an incorrect categorization, flagging a semantic relationship within the data structure as potentially inaccurate; and reporting the potentially inaccurate categorization.

11. The computer program product of claim 10, wherein the determining comprises sending a query to a common knowledge repository to verify a relationship between nodes in the data structure.

\* \* \* \* \*